Figure 8:
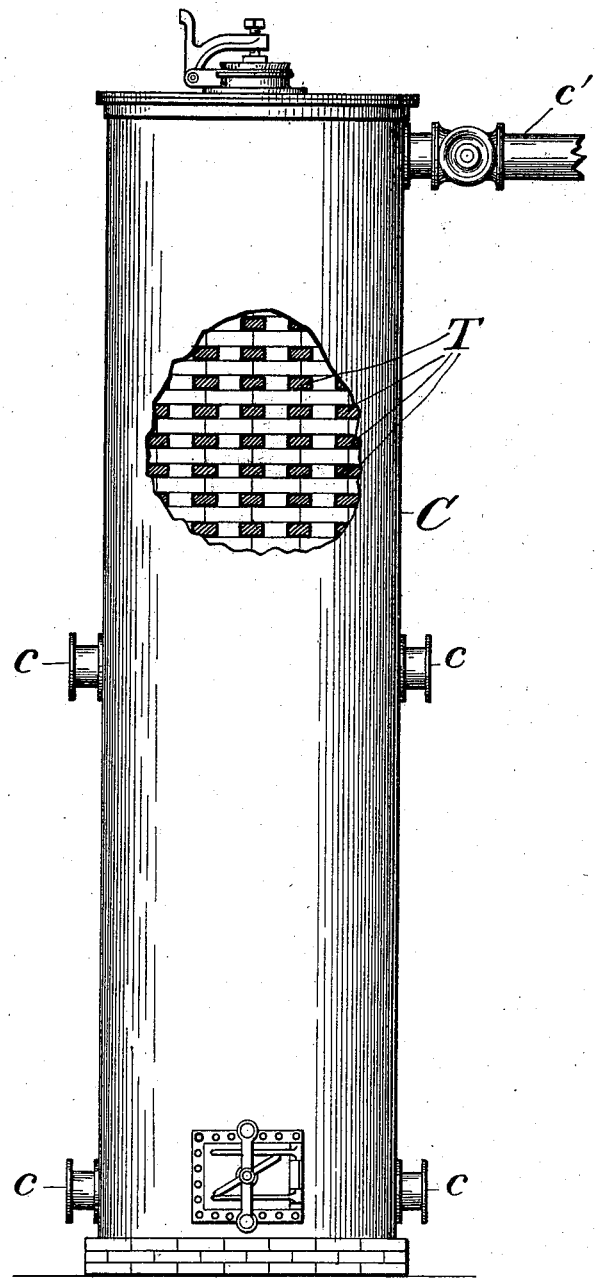

(No Model.) 2 Sheets—Sheet 1.
J. B. ARCHER.
TILE FOR USE IN APPARATUS FOR THE MANUFACTURE OF GAS.
No. 504,314. Patented Sept. 5, 1893.
FIG. 1. FIG. 1.ᵃ
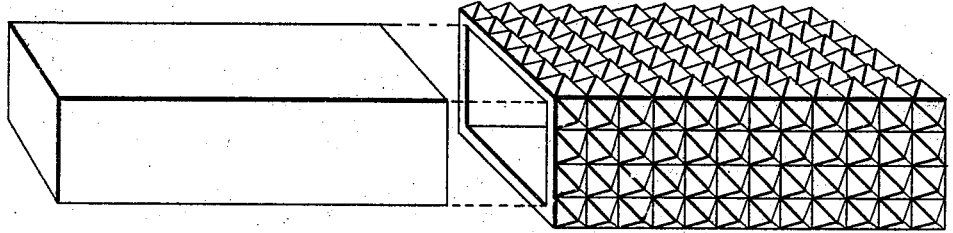
FIG. 2. FIG. 2.ᵃ
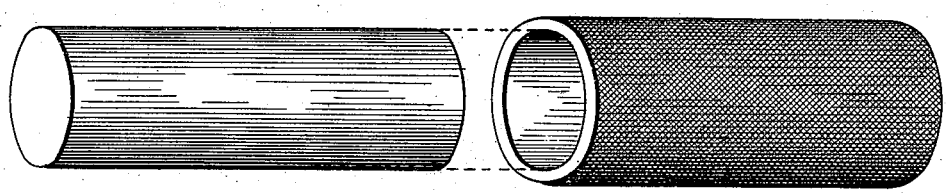
FIG. 3. FIG. 3.ᵃ
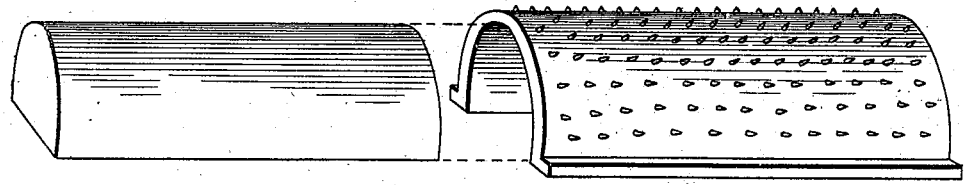
FIG. 4. FIG. 4.ᵃ
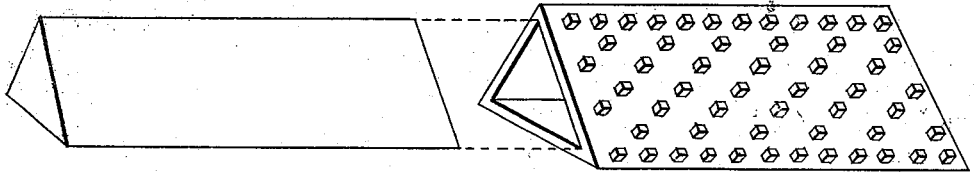
FIG. 5. FIG. 5.ᵃ
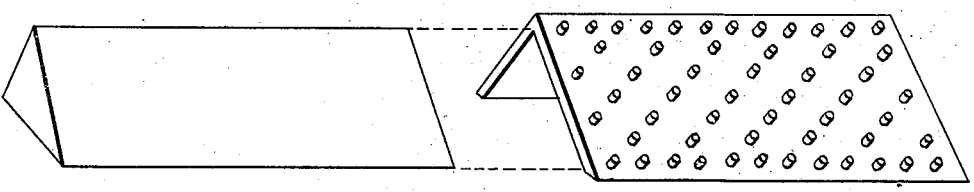
FIG. 6. FIG. 7.
Witnesses
H. L. Amer.
John C. Wilson.
Inventor
John B. Archer,
by Whitman & Wilkinson
Attorneys

UNITED STATES PATENT OFFICE.

JOHN B. ARCHER, OF WASHINGTON, DISTRICT OF COLUMBIA.

TILE FOR USE IN APPARATUS FOR THE MANUFACTURE OF GAS.

SPECIFICATION forming part of Letters Patent No. 504,314, dated September 5, 1893.

Application filed February 3, 1893. Serial No. 460,918. (No model.)

*To all whom it may concern:*

Be it known that I, JOHN B. ARCHER, a citizen of the United States, residing at Washington, in the District of Columbia, have invented certain new and useful Improvements in Tiles for Use in Apparatus for the Manufacture of Gas; and I do hereby declare the following to be a full, clear, and exact description of the invention, such as will enable others skilled in the art to which it appertains to make and use the same.

My invention relates to improvements in the manner of arranging and supporting the iron surfaces provided for exposure to the action of the gases in the checkerwork of fixers or converters employed in fixing gases made from carbon or hydrocarbons and steam. The iron is exposed while highly heated to the action of the gases in order that the oxygen of the steam may combine with the iron and leave the hydrogen free to combine with the carbon; also the iron combines with the sulphureted hydrogen in the gas purifying it and removing its offensive odor. It has been found that the iron bars most commonly in use in the checkerwork of such converters must be made of considerable cross section in order to prevent their being so oxidized as to fall to pieces or so softened by the heat as to melt and run together, or to bend down, and so choke the passages in the said checkerwork. To obviate these faults, I provide a (preferably) roughened iron shell upon a refractory core or support.

A further advantage gained by having a tile made with a core of fire clay or similar material is that the conductivity of the fire clay is less than that of the iron and therefore the heat is given off more gradually and uniformly; while at the same time the specific heat of the fire clay is greater than that of the iron, and therefore as a heat reservoir, the tiles are capable of containing a larger amount of heat than a like weight of iron, and thus extending the times of the runs of gas. Again the refractory cores are cheaper than the iron while the iron is placed in such a position as to be most efficient. And, moreover, the refractory tiles will stand a much higher heat than the iron bars hitherto used. And should at any time, the heat be raised sufficiently high to melt any of the iron casings the tile core will stand and hold the checkerwork structure intact and the process of making gas go on till such time as the fixer can be opened and the core tiles recased.

Another desirable result gained by coating the fire clay with an iron shell, is to measurably prevent the absorption of the oil commonly used in the manufacture of gas, by the fire clay, which absorbed oil causes the disintegration of the fire clay and the destruction of the tile.

Reference is had to the accompanying drawings, in which—

Figure 1 represents a perspective view of one form of refractory core which is adapted to slip into and support the iron shell shown in perspective in Fig. 1$^a$. Fig. 2 represents a perspective view of another form of refractory core, a cylinder, which is adapted to slide into the hollow iron cylinder shown in perspective in Fig. 2$^a$. Fig. 3 represents a perspective view of another form of refractory support, and Fig. 3$^a$ represents an iron shell adapted to fit thereon and be supported thereby. Fig. 4 represents in perspective a triangular core of refractory material and Fig. 4$^a$ a form of iron shell adapted to slip over and to be supported by the said core. Fig. 5 represents in perspective a triangular refractory support for the inverted trough shaped iron plate shown in perspective in Fig. 5$^a$. Fig. 6 represents in perspective, a hexagonal tile covered with a sheathing of roughened iron, and Fig. 7 represents an octagonal tile also covered with a sheathing of roughened iron. Fig. 8 represents a side elevation of a gas fixer or converter, parts being broken away to show the manner of using the herein-described tiles, which tiles are indicated by the letter T.

It will be seen that the outer surface of the iron is represented in all the figures as being roughened or studded with raised projections of various shapes. These studs or projections largely increase the efficiency of the plate by increasing the area of the surface exposed to the action of the oxygen in the steam.

The converter C shown in Fig. 8, has inlets $c$ for the mixture of gas and steam, which rises through one or more tiers of tiles arranged in checkerwork as shown, and escapes through an outlet pipe $c'$.

I do not claim any particular form of converter in connection with these tiles, as they are adapted for use in most of the well known forms of converters.

Having thus described my invention, what I claim, and desire to secure by Letters Patent of the United States, is—

1. The combination with a gas fixer having a suitable casing and gas inlets and outlets, of a filling of tiles, each of said tiles having a fire clay core and an iron shell exterior thereto, substantially as and for the purposes described.

2. The combination with a gas fixer having a suitable casing and gas inlets and outlets, of a filling of tiles, each of said tiles having a fire clay core and an iron shell exterior thereto and roughened on its outer surface, substantially as and for the purposes described.

In testimony whereof I affix my signature in presence of two witnesses.

JOHN B. ARCHER.

Witnesses:
H. D. BURGESS,
JOHN C. WILSON.